US007574343B2

(12) United States Patent (10) Patent No.: US 7,574,343 B2
Levi et al. (45) Date of Patent: *Aug. 11, 2009

(54) SYSTEM AND METHOD FOR LOGICAL MODELING OF DISTRIBUTED COMPUTER SYSTEMS

(75) Inventors: Steven Levi, Redmond, WA (US); Galen Hunt, Bellevue, WA (US); Aamer Hydrie, Seattle, WA (US); Jakob Rehof, Redmond, WA (US); Bassam Tabbara, Seattle, WA (US); Robert Welland, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 461 days.

This patent is subject to a terminal disclaimer.

(21) Appl. No.: 11/276,608

(22) Filed: Mar. 7, 2006

(65) Prior Publication Data

US 2006/0149838 A1 Jul. 6, 2006

Related U.S. Application Data

(63) Continuation of application No. 09/695,813, filed on Oct. 24, 2000, now Pat. No. 7,113,900.

(51) Int. Cl.
*G06F 17/50* (2006.01)
*G06F 7/62* (2006.01)
(52) U.S. Cl. ........................................ 703/13
(58) Field of Classification Search ............... 703/13; 709/203, 226, 229
See application file for complete search history.

(56) References Cited

U.S. PATENT DOCUMENTS 4,200,770 A 4/1980 Hellman et al.

(Continued)

FOREIGN PATENT DOCUMENTS

CN 1368694 9/2002

(Continued)

OTHER PUBLICATIONS

Official Notice of Rejection for Mexican patent application No. 2004-001431 mailed on Aug. 2, 2007, pp. 5.

(Continued)

*Primary Examiner*—Paul L Rodriguez
*Assistant Examiner*—Dwin M Craig
(74) *Attorney, Agent, or Firm*—Lee & Hayes, PLLC

(57) ABSTRACT

A modeling system permits developers of applications for distributed computer system, such as those used in server data centers or Internet data centers (IDCs), to architect their hardware and software in an abstract manner. The modeling system defines a set of components that represent abstract functional operations of the application that will eventually be physically implemented by one or more computers and one or more software programs executing on the computers. Associated with the model components is a schema that dictates how the functional operations are to be specified. From the model components, the developers can create logical, scale-independent models of the applications that may be implemented by the distributed computer system. The application is scale-independent in that the application is invariant in respect to the number of computers and software programs that my eventually be used to implement it. The application may subsequently be converted to a physical blueprint that specifies the number and type of hardware/software resources and the physical layout of the distributed computer system.

19 Claims, 5 Drawing Sheets

U.S. PATENT DOCUMENTS

| | | | |
|---|---|---|---|
| 4,218,582 A | 8/1980 | Hellman et al. | |
| 4,405,829 A | 9/1983 | Rivest et al. | |
| 4,424,414 A | 1/1984 | Hellman et al. | |
| 5,031,089 A | 7/1991 | Liu et al. | |
| 5,115,505 A | 5/1992 | Bishop et al. | |
| 5,220,621 A | 6/1993 | Saitoh | |
| 5,371,852 A | 12/1994 | Attanasio et al. | |
| 5,430,810 A | 7/1995 | Saeki | |
| 5,475,817 A | 12/1995 | Waldo et al. | |
| 5,490,276 A | 2/1996 | Doli, Jr. et al. | |
| 5,499,357 A | 3/1996 | Sonty et al. | |
| 5,504,921 A * | 4/1996 | Dev et al. | 709/223 |
| 5,539,883 A | 7/1996 | Allon et al. | |
| 5,557,774 A | 9/1996 | Shimabukuro et al. | |
| 5,579,482 A | 11/1996 | Einkauf et al. | |
| 5,668,995 A | 9/1997 | Bhat | |
| 5,686,940 A | 11/1997 | Kuga | |
| 5,724,508 A | 3/1998 | Harple, Jr. et al. | |
| 5,748,958 A | 5/1998 | Badovinatz et al. | |
| 5,758,351 A | 5/1998 | Gibson et al. | |
| 5,768,271 A | 6/1998 | Seid et al. | |
| 5,774,660 A | 6/1998 | Brendel et al. | |
| 5,774,668 A | 6/1998 | Choquier et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,801,970 A | 9/1998 | Rowland et al. | |
| 5,815,574 A | 9/1998 | Fortinsky | |
| 5,818,937 A | 10/1998 | Watson et al. | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,850,399 A | 12/1998 | Ganmukhi et al. | |
| 5,867,706 A | 2/1999 | Martin et al. | |
| 5,872,914 A | 2/1999 | Walker, Jr. et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,918,017 A | 6/1999 | Attanasio et al. | |
| 5,930,798 A | 7/1999 | Lawler et al. | |
| 5,938,732 A | 8/1999 | Lim et al. | |
| 5,948,055 A | 9/1999 | Pulsipher et al. | |
| 5,951,694 A | 9/1999 | Choquier et al. | |
| 5,958,009 A | 9/1999 | Friedrich et al. | |
| 5,960,371 A | 9/1999 | Saito et al. | |
| 5,968,126 A | 10/1999 | Ekstrom et al. | |
| 6,012,113 A | 1/2000 | Tuckner | |
| 6,035,405 A | 3/2000 | Gage et al. | |
| 6,041,054 A | 3/2000 | Westberg | |
| 6,047,323 A | 4/2000 | Krause | |
| 6,047,325 A | 4/2000 | Jain et al. | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,070,243 A | 5/2000 | See et al. | |
| 6,073,183 A | 6/2000 | Slonim | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,086,618 A | 7/2000 | Al-Hilali et al. | |
| 6,097,818 A | 8/2000 | Saito | |
| 6,108,699 A | 8/2000 | Moiin | |
| 6,108,702 A | 8/2000 | Wood | |
| 6,111,993 A | 8/2000 | Matsunaga | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,141,749 A | 10/2000 | Coss et al. | |
| 6,144,959 A | 11/2000 | Anderson et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,167,515 A | 12/2000 | Lin | |
| 6,178,529 B1 | 1/2001 | Short et al. | |
| 6,182,275 B1 | 1/2001 | Beelitz et al. | |
| 6,185,308 B1 | 2/2001 | Ando et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,215,877 B1 | 4/2001 | Matsumoto | |
| 6,215,878 B1 | 4/2001 | Harkins | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 | 5/2001 | LeBlanc et al. | |
| 6,236,901 B1 | 5/2001 | Goss | |
| 6,253,230 B1 | 6/2001 | Couland et al. | |
| 6,256,773 B1 | 7/2001 | Bowman-Amuah | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,272,522 B1 | 8/2001 | Lin et al. | |
| 6,272,523 B1 | 8/2001 | Factor | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,317,438 B1 | 11/2001 | Trebes, Jr. | |
| 6,324,571 B1 | 11/2001 | Hacherl | |
| 6,327,622 B1 | 12/2001 | Jindal et al. | |
| 6,330,602 B1 | 12/2001 | Law et al. | |
| 6,330,605 B1 | 12/2001 | Christensen et al. | |
| 6,336,138 B1 | 1/2002 | Caswell et al. | |
| 6,336,171 B1 | 1/2002 | Coskrey, IV | |
| 6,338,112 B1 | 1/2002 | Wipfel et al. | |
| 6,341,356 B1 | 1/2002 | Johnson et al. | |
| 6,351,685 B1 | 2/2002 | Dimitri et al. | |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,366,578 B1 | 4/2002 | Johnson | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 | 5/2002 | Zager et al. | |
| 6,393,456 B1 | 5/2002 | Ambler et al. | |
| 6,393,474 B1 | 5/2002 | Eichert et al. | |
| 6,393,485 B1 | 5/2002 | Chao et al. | |
| 6,408,390 B1 | 6/2002 | Saito | |
| 6,424,718 B1 | 7/2002 | Holloway | |
| 6,424,992 B2 | 7/2002 | Devarakonda et al. | |
| 6,427,163 B1 | 7/2002 | Arendt et al. | |
| 6,427,171 B1 | 7/2002 | Craft et al. | |
| 6,438,100 B1 | 8/2002 | Halpern et al. | |
| 6,442,557 B1 | 8/2002 | Buteau et al. | |
| 6,449,641 B1 | 9/2002 | Moiin et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,932 B1 | 10/2002 | Dennis et al. | |

| Patent No. | Date | Inventors |
|---|---|---|
| 6,466,978 B1 | 10/2002 | Mukherjee et al. |
| 6,466,984 B1 | 10/2002 | Naveh et al. |
| 6,466,985 B1 | 10/2002 | Goyal et al. |
| 6,470,025 B1 | 10/2002 | Wilson et al. |
| 6,470,332 B1 | 10/2002 | Weschler |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,487,622 B1 | 11/2002 | Coskrey, IV et al. |
| 6,493,715 B1 | 12/2002 | Funk et al. |
| 6,496,187 B1 | 12/2002 | Deering et al. |
| 6,502,131 B1 | 12/2002 | Vaid et al. |
| 6,505,244 B1 | 1/2003 | Natarajan et al. |
| 6,510,154 B1 | 1/2003 | Mayes et al. |
| 6,510,509 B1 | 1/2003 | Chopra et al. |
| 6,519,615 B1 | 2/2003 | Wollrath et al. |
| 6,529,953 B1 | 3/2003 | Van Renesse |
| 6,539,494 B1 | 3/2003 | Abramson et al. |
| 6,542,504 B1 | 4/2003 | Mahler et al. |
| 6,546,423 B1 | 4/2003 | Dutta et al. |
| 6,546,553 B1 | 4/2003 | Hunt |
| 6,549,516 B1 | 4/2003 | Albert et al. |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,578,144 B1 | 6/2003 | Gennaro et al. |
| 6,584,499 B1 | 6/2003 | Jantz et al. |
| 6,587,876 B1 | 7/2003 | Mahon et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |
| 6,615,256 B1 | 9/2003 | van Ingen et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |
| 6,684,335 B1 | 1/2004 | Epstein, III et al. |
| 6,691,148 B1 | 2/2004 | Zinky et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 | 5/2004 | Bond |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 | 6/2004 | Narisi et al. |
| 6,760,765 B1 | 7/2004 | Asai et al. |
| 6,760,775 B1 | 7/2004 | Anerousis et al. |
| 6,769,008 B1 | 7/2004 | Kumar et al. |
| 6,769,060 B1 | 7/2004 | Dent et al. |
| 6,772,333 B1 | 8/2004 | Brendel |
| 6,779,016 B1 | 8/2004 | Aziz et al. |
| 6,782,408 B1 | 8/2004 | Chandra et al. |
| 6,801,528 B2 | 10/2004 | Nassar |
| 6,801,937 B1 | 10/2004 | Novaes et al. |
| 6,804,783 B1 | 10/2004 | Wesinger et al. |
| 6,813,778 B1 | 11/2004 | Poli et al. |
| 6,816,897 B2 | 11/2004 | McGuire |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B1 | 12/2004 | Wong et al. |
| 6,845,160 B1 | 1/2005 | Aoki |
| 6,853,841 B1 | 2/2005 | St. Pierre |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,915,338 B1 | 7/2005 | Hunt et al. |
| 6,922,791 B2 | 7/2005 | Mashayekhi et al. |
| 6,928,482 B1 | 8/2005 | Ben Nun et al. |
| 6,944,759 B1 | 9/2005 | Crisan |
| 6,947,987 B2 | 9/2005 | Boland |
| 6,957,186 B1 | 10/2005 | Guheen et al. |
| 6,963,981 B1 | 11/2005 | Bailey et al. |
| 6,968,291 B1 | 11/2005 | Desai |
| 6,968,550 B2 | 11/2005 | Branson et al. |
| 6,968,551 B2 | 11/2005 | Hediger et al. |
| 6,971,063 B1 | 11/2005 | Rappaport et al. |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,983,317 B1 | 1/2006 | Bishop et al. |
| 6,985,956 B2 | 1/2006 | Luke et al. |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,050,961 B1 | 5/2006 | Lee et al. |
| 7,054,943 B1 | 5/2006 | Goldszmidt et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,633 B2 | 7/2006 | Tormasov et al. |

| Patent No. | Date | Inventor |
|---|---|---|
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,089,530 B1 | 8/2006 | Dardinski et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |
| 7,103,874 B2 | 9/2006 | McCollum et al. |
| 7,113,900 B1 | 9/2006 | Hunt et al. |
| 7,117,158 B2 | 10/2006 | Weldon et al. |
| 7,117,261 B2 | 10/2006 | Kryskow, Jr. et al. |
| 7,120,154 B2 | 10/2006 | Bavant et al. |
| 7,124,289 B1 | 10/2006 | Suorsa |
| 7,127,625 B2 | 10/2006 | Farkas et al. |
| 7,131,123 B2 | 10/2006 | Suorsa et al. |
| 7,134,011 B2 | 11/2006 | Fung |
| 7,134,122 B1 | 11/2006 | Sero et al. |
| 7,139,930 B2 | 11/2006 | Mashayekhi et al. |
| 7,139,999 B2 | 11/2006 | Bowman-Amuah |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Malmer et al. |
| 7,162,427 B1 | 1/2007 | Myrick et al. |
| 7,162,509 B2 | 1/2007 | Brown et al. |
| 7,174,379 B2 | 2/2007 | Agarwal et al. |
| 7,181,731 B2 | 2/2007 | Pace et al. |
| 7,191,344 B2 | 3/2007 | Lin et al. |
| 7,194,439 B2 | 3/2007 | Kassan et al. |
| 7,194,616 B2 | 3/2007 | Axnix et al. |
| 7,197,418 B2 | 3/2007 | Fuller, III et al. |
| 7,200,530 B2 | 4/2007 | Brown et al. |
| 7,200,655 B2 | 4/2007 | Hunt et al. |
| 7,203,911 B2 | 4/2007 | Williams |
| 7,213,231 B1 | 5/2007 | Bandhole et al. |
| 7,222,147 B1 | 5/2007 | Black et al. |
| 7,225,441 B2 | 5/2007 | Kozuch et al. |
| 7,231,410 B1 | 6/2007 | Walsh et al. |
| 7,254,634 B1 | 8/2007 | Davis et al. |
| 7,257,584 B2 | 8/2007 | Hirschfeld et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,561 B2 | 12/2007 | Hunt et al. |
| 7,313,573 B2 | 12/2007 | Leung et al. |
| 7,315,801 B1 | 1/2008 | Dowd et al. |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,367,028 B2 | 4/2008 | Kodosky et al. |
| 7,370,103 B2 | 5/2008 | Hunt et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,406,517 B2 | 7/2008 | Hunt et al. |
| 7,464,147 B1 | 12/2008 | Fakhouri et al. |
| 2001/0014158 A1 | 8/2001 | Baltzley |
| 2001/0016909 A1 | 8/2001 | Gehrmann |
| 2001/0019554 A1 | 9/2001 | Nomura et al. |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0022952 A1 | 2/2002 | Zager et al. |
| 2002/0038421 A1 | 3/2002 | Hamada |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0087264 A1 | 7/2002 | Hills et al. |
| 2002/0090089 A1 | 7/2002 | Branigan et al. |
| 2002/0095524 A1 | 7/2002 | Sanghvi et al. |
| 2002/0099785 A1 | 7/2002 | Teeple |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0171690 A1 | 11/2002 | Fox et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028642 A1 | 2/2003 | Agarwal et al. |
| 2003/0028770 A1 | 2/2003 | Litwin, Jr. et al. |
| 2003/0041139 A1 | 2/2003 | Beadles et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126230 A1 | 7/2003 | Donatelli et al. |
| 2003/0126464 A1 | 7/2003 | McDaniel et al. |
| 2003/0130833 A1 | 7/2003 | Brownell et al. |
| 2003/0138105 A1 | 7/2003 | Challener et al. |
| 2003/0154404 A1 | 8/2003 | Beadles et al. |
| 2003/0165140 A1 | 9/2003 | Tang et al. |
| 2003/0204734 A1 | 10/2003 | Wheeler |
| 2003/0206548 A1 | 11/2003 | Bannai et al. |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0054791 A1 | 3/2004 | Chakraborty et al. |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0208292 A1 | 10/2004 | Winterbottom |
| 2004/0226010 A1 | 11/2004 | Suorsa |
| 2004/0261079 A1 | 12/2004 | Sen |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |

| | | | |
|---|---|---|---|
| 2005/0021742 | A1 | 1/2005 | Yemini et al. |
| 2005/0055435 | A1 | 3/2005 | Gbadegesin et al. |
| 2005/0080811 | A1 | 4/2005 | Speeter et al. |
| 2005/0086502 | A1 | 4/2005 | Rayes et al. |
| 2005/0091078 | A1 | 4/2005 | Hunt et al. |
| 2005/0091227 | A1 | 4/2005 | McCollum et al. |
| 2005/0097097 | A1 | 5/2005 | Hunt et al. |
| 2005/0097146 | A1 | 5/2005 | Konstantinou et al. |
| 2005/0102388 | A1 | 5/2005 | Tabbara et al. |
| 2005/0125212 | A1 | 6/2005 | Hunt et al. |
| 2005/0138416 | A1 | 6/2005 | Qian et al. |
| 2005/0152270 | A1 | 7/2005 | Gomez Paredes et al. |
| 2005/0192971 | A1 | 9/2005 | Tabbara et al. |
| 2005/0193103 | A1 | 9/2005 | Drabik |
| 2005/0246529 | A1 | 11/2005 | Hunt et al. |
| 2005/0246771 | A1 | 11/2005 | Hunt et al. |
| 2005/0251783 | A1 | 11/2005 | Torone et al. |
| 2005/0257244 | A1 | 11/2005 | Joly et al. |
| 2006/0025984 | A1 | 2/2006 | Papaefstathiou et al. |
| 2006/0025985 | A1 | 2/2006 | Vinberg et al. |
| 2006/0031248 | A1 | 2/2006 | Vinberg et al. |
| 2006/0034263 | A1 | 2/2006 | Outhred et al. |
| 2006/0037002 | A1 | 2/2006 | Vinberg et al. |
| 2006/0048017 | A1 | 3/2006 | Anerousis et al. |
| 2006/0123040 | A1 | 6/2006 | McCarthy et al. |
| 2006/0149838 | A1 | 7/2006 | Hunt et al. |
| 2006/0155708 | A1 | 7/2006 | Brown et al. |
| 2006/0161879 | A1 | 7/2006 | Lubrecht et al. |
| 2006/0161884 | A1 | 7/2006 | Lubrecht et al. |
| 2006/0235664 | A1 | 10/2006 | Vinberg et al. |
| 2006/0259609 | A1 | 11/2006 | Hunt et al. |
| 2006/0259610 | A1 | 11/2006 | Hunt et al. |
| 2006/0271341 | A1 | 11/2006 | Brown et al. |
| 2007/0006177 | A1 | 1/2007 | Aiber et al. |
| 2007/0112847 | A1 | 5/2007 | Dublish et al. |
| 2007/0192769 | A1 | 8/2007 | Mimura et al. |
| 2008/0059214 | A1 | 3/2008 | Vinberg et al. |

FOREIGN PATENT DOCUMENTS

| | | | |
|---|---|---|---|
| CN | 1375685 | | 10/2002 |
| EP | 0962861 | A2 | 12/1999 |
| EP | 1063815 | A2 | 12/2000 |
| EP | 1180886 | A1 | 2/2002 |
| EP | 1307018 | A1 | 5/2003 |
| JP | 8297567 | | 11/1996 |
| JP | 11007407 | | 1/1999 |
| JP | 2001526814 | | 12/2001 |
| JP | 2002084302 | | 3/2002 |
| JP | 2003532784 | | 11/2003 |
| JP | 2005155729 | | 6/2005 |
| KR | 10-2002-0026751 | | 4/2002 |
| KR | 10-2004-0008275 | | 1/2004 |
| WO | WO9853410 | | 11/1998 |
| WO | WO9963439 | | 12/1999 |
| WO | WO0022526 | | 4/2000 |
| WO | WO0031945 | | 6/2000 |
| WO | WO0073929 | | 12/2000 |
| WO | WO0237748 | | 5/2002 |
| WO | WO02085051 | | 10/2002 |
| WO | WO03017615 | A1 | 2/2003 |
| WO | WO03039104 | | 5/2003 |

OTHER PUBLICATIONS

"Hardware Design of a 2-D Motion Estimation System Based on the Hough Transform" IEEE 1998 16 pages.
Liu et al., "Visualization in Network Topology Optimization", ACM, 1992, pp. 131-138.
"Distributed Management of Future Global Multi-Service Networks" British Telecommunications EngineeringLondon GB v. 13 part 3 Oct. 1, 1994 pp. 221-226.
"Hybrid: Unifying Centralised and Distributed Network Management using Intelligent Agents" IEEE Network Operations and Management Symposium Kyoto Apr. 15-19, 1996. pp. 34-43.
Webster's Seventh New Collegiate Dictionary. G. C. Merriam Co. Copyright 1971 pp. 438 and 767.
Araki, " Linux Security Diary, Use VLAN in Linux" , Linux Japan, Itsutsubashi Research Co.,ltd., vol. 3, No. 11, Nov. 1, 2000, pp. 110-113 (CSDB: National Academy Paper 200300158009).
Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).
Bagrodia, et al., "A Scalable Distrubted Middleware Service Architecture to Support Mobile Internet Applications," Wireless Networks V.9 N 4 Jul. 2003 Kluwer Academic Publishers. Manufacturered int he Netherlands; pp. 311-320.
"C.O.B.A.S Centralized Out-Of-Band Authentication System", QT Worldtel Inc., Sep. 8-9, 2003, pp. 14.
Chao, "Next Generation Routers," Proceedings of the IEEE. vol. 90 No. 9 Sep. 2002.
Chen, et al., "Performance Prediction of Component-based Applications", available at least as early as Jan. 10, 2007, at <<http://www.ug.it.usyd.edu.au/~iango/papers/jss_paper_draft_0503.pdf>>, pp. 1-12.
Choi, et al., "A High-Speed Multi-layer Lookup for Policy Based Packet Classification Using TCAM," Proceedings of the IASTED International Conference Communication Systems and Networks Sep. 9-12, 2002 Malaga Spain.
Cohen, et al., "On the Performance of TCP Splicing for URL-Aware Redirection," Proceedings of UITS'99: The 2nd USENIX Symposium on Internet Technologies & Systems; Boulder Colorado USA Oct. 11-14, 1999; 10 pages.
"Enhanced IP Services for Cisco Networks", retrieved on Jun. 19, 2007, at <<http://proquest.safaribooksonline.com/1578701066>>, Sep. 23, 1999, pp. 11.
Frolund, et al., "Design-Time Simulation of a Large-Scale, Distrubuted object System" ACM 1998, pp. 374-400.
Garschhammer, et al., "Towards generic Service Management Concepts A Service Model Based Approach", 14 pages.
Gopal, et al., "Policy Based Access Router Selections and Context Transfers in Mobile IP," Network Control and Engineering for QoS; Security and Mobility (net-Con 2002).
Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican.eszSzpublicationszSzmgh-jlm-jjg-jcp-jmd-2002a.pdf/mast-an-open-environment.pdf>>, pp. 1-16.
Hardwick, et al., "Modeling the Performance of E-Commerce Site", Jan. 6, 2007, at <<http://www.cs.cmu.edu/~jch/publications/hardwick01modeling.html>>. Journal of Computer Resource Management, 2002, pp. 1-11.
Kahn, "Report on DIMAC Workshop on Trust Management", retrieved on May 19, 2005 from <<http://web.archive.org/web/19970603132755/www.jya.com/dimacs.txt>>, 5 pages.
Kihl, et al., "Admission Control Schemes Guaranteeing Customer QOS in Commercial Web Sites," Network Control and Engineering for QoS Security and Mobility (Net-Con 2002); Oct. 2002; pp. 305-316.
Kim, et al., "Content-Adaptive Request Distribution Strategy for INternet Server Cluster," W. Change (ed): Asia 2002 LNCs 2402 pp. 85-94 Aug. 2002. copyright Springer-Verlag Berlin Heidelberg 2002.
Kounev, "A Capacity Planning Methodology for Distributed E-Commerce Applications", Jan. 2, 2001, pp. 1-13.
Levillain, et al., "Switch-Based Server Load Balancing for Enterprises." Alcatel Telecommunications Review; No. 4 pp. 298-302; 2002.
Mahon, "OpenView PolicyXpert: Heterogeneous Configuration and Control", OpenView Policy-Based Network Management, Feb. 1999, 4 pages.
Maughan et al., "Security Associations: Building Blocks for Secure Communications", IEEE—Symposium on Computers and Communicatons, pp. 157-163, 1995.

Moore, "Network Interoperability Program", MILCOM 97 Proceedings, vol. 3, pp. 1152-1155, 1997.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

"Pretty Good Privacy PGP for Personal Privacy, Version 5.0 For Windows 95 Windows NT", Pretty Good Privacy Inc., 1997. pp. 137.

Schneier, "Applied Crytography Protocols, Algorithms and Source Code in C, Second Edition", 1996, John Wiley & Sons, Inc., New York, p. 461, pp. 466-468, pp. 513-514.

Selic, "A Generic Framework for Modeling Resources with UML", IEEE, Jun. 2000, pp. 64-69.

Somegawa, et al., "The Effects of Server Placement and server selection for Internet Services", IEICE TRANS. COMMUN., vol. e86-b, No. 2, Feb. 2003, pp. 542-552.

Sultan, et al., "Migratory TCP: Connection Migration for Service Continuity," in the Internet Proceedings 22nd Intl. Conference on Distributed Computing Systems; Jul. 2002; pp. 469-470.

Sultan, et al., "Position Summary: Transport Layer Support for Highly-Available Network Services," Prejdgs. Eith Workshop on Itot Topics in Operating Systems. p. 182; May 2001.

Takahashi, et al., "APE: Fast and Secure Active Networking Architecture for Active Packet Editing," 2002 IEEE Open Architectures and Network Programming Procedures; (Open Arch 2002); Jun. 2002; pp. 104-113.

Uga, et al., "A High-Speed Packet Classification Using TCAM," IEICE Trans. On Communications vol. e85-b No. 9 Sep. 2002.

Vadim, "On Virtual Data Centers and Their Operating Environments", at <<http://www.hpl.hp.com/techreports/2001/HPL-2001-44.html>>, Mar. 8, 2001, pp. 1-20.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.

Howard et al., "Designing Secure Web-Based Applications for Microsoft Windows 2000", 2000.

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Shi et al., "An Effective Model for Composition of Secure Systems", The Journal of Systems and Software, 1998, pp. 233-244.

Burns, et al., "Allocation and Data Placement Using Virtual Contiguity", pp. 1-6, iNIST/SSRC/01-001, 2001.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

Chunxiao, et al., Configure and move the e-Commerce Business Model by Utilizing XML, Applications of Computer Systems, No. 2, p. 8-11, 2002.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx, Published Nov. 15, 2004.

Dekhil, et al., "Generalized Policy Model for Application and Service Management", Hewlett-Packard Laboratories, Software Technology Lab, 3 pages, 1999.

Menezes, et al., "Handbook of Applied Cryptography", CRC Press, 1996, Chapters 8 & 12, pp. 283-319 and 489-541.

"Integrated Security Managment", OpenPMF(Policy Managment Framework), 2 pages, cited in related matter's search report dated Mar. 8, 2006.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated copy of the Japanese Office Action mailed on Jan. 26, 2007 for Japanese Patent Application No. 2001-326848, a counterpart foreign application of US Patent No. 6,886,038.

Translated copy of the Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Lee, et al., "Community Services: A Toolkit for Rapid Deployment of Network Services", Proceedings of the IEEE International Conference on Cluster Computing, Cluster 2002, IEEE, 2002, 4 pages.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

"System Definition Model," Windows Server System Home, http://www.microsoft.com/windowsserversystem/dsi/sdm.mspx, published Dec. 15, 2003.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

Yuhui, e-Commerce Based on ERP for Enterprize by Utilizing DNA and XML, Computer Engineering, vol. 27, No. 6, p. 165,166,182, Jun. 2001.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

* cited by examiner

SYSTEM AND METHOD FOR LOGICAL MODELING OF DISTRIBUTED COMPUTER SYSTEMS

This application is a continuation of U.S. application Ser. No. 09/695,813, filed on Oct. 24, 2000, entitled "System and Method for Logical Modeling of Distributed Computer Systems", now U.S. Pat. No. 7,113,900. The benefit of the filing date of this parent application is hereby claimed to the fullest extent permitted by 35 U.S.C. § 120, and the contents of the parent application are incorporated by this reference as if set forth verbatim herein.

TECHNICAL FIELD

This invention relates to distributed computer systems, such as Websites and Internet-based Services. More particularly, this invention pertains to a way to model an application for a distributed computer system in a scale-invariant manner that is abstracted from the underlying physical configuration.

BACKGROUND

It is no secret that Internet usage has exploded over the past few years and continues to grow rapidly. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is an Internet data center (IDC), which is a specifically designed complex that houses many computers used for hosting Internet-based services. IDCs, which also go by the names "webfarms" and "server farms", typically house hundreds to thousands of computers in climate-controlled, physically secure buildings. These computers are interconnected to run one or more programs supporting one or more Internet services or Websites. IDCs provide reliable Internet access, reliable power supplies, and a secure operating environment.

FIG. 1 shows an Internet data center 100. It has many server computers 102 arranged in a specially constructed room. The computers are general-purpose computers, typically configured as servers. An Internet data center may be constructed to house a single site for a single entity (e.g., a data center for Yahoo! or MSN), or to accommodate multiple sites for multiple entities (e.g., an Exodus center that host sites for multiple companies).

The IDC 100 is illustrated with three entities that share the computer resources: entity A, entity B, and entity C. These entities represent various companies that want a presence on the Web. The IDC 100 has a pool of additional s computers 104 that may be used by the entities at times of heavy traffic. For example, an entity engaged in online retailing may experience significantly more demand during the Christmas season. The additional computers give the IDC flexibility to meet this demand.

While there are often many computers, an Internet service or Website may only run a few programs. For instance, one Website may have 2000-3000 computers but only 10-20 distinct software components. Computers may be added daily to provide scalability as the Website receives increasingly more visitors, but the underlying programs change less frequently. Rather, there are simply more computers running the same software in parallel to accommodate the increased volume of visitors.

Today, there is no conventional way to architect Internet Services in a way that abstracts the functionality of the Service from the underlying physical implementation. Little thought has gone into how to describe a complete Internet Service in any manner, let alone a scale-invariant manner. At best, Internet Service operators might draft a document that essentially shows each and every computer, software program, storage device, and communication link in the center as of a specific time and date. The downside with such physical schematics is, of course, that the document is always out of date and hence, it is of limited usefulness as a management tool. Furthermore, while a human may understand such a document, it holds no meaning to a computer.

SUMMARY

A modeling system permits developers to architect distributed computer applications, such as Internet Services or Websites, in an abstract manner. The modeling system defines a set of components that represent functional units of the applications that will eventually be physically implemented by one or more computers and one or more software programs executing on the computers.

In the described implementation, the modeling system defines several model components: a module, a port, and a wire; and a set of model extensions including, but not limited to: a store, an event source, an event sink, and an event wire.

The module is the basic functional unit and represents a container of behavior that may be implemented by one or more computers running one or more software programs. For instance, in the context of a Website, one module might represent a front end that renders HTML pages, another module might represent a login database, and another module might represent a mailbox program. A port is a service access point for the module. All communications into and out of the module goes through a port. A wire is the logical binding that defines an allowed communication route between two ports.

While the model consists of the three basic components described above (namely modules, ports, and wires), the model can be augmented with numerous extensions, specializations of the basic components. For example, a store is a basic unit of storage and a specialization of the module. A store represents a logical amount of storage, which may be implemented by any number of physical disks or other storage media. Like the module, the store represents behavior, in the case the ability to save and retrieve data. Also like the module, the store can communicate with other modules and stores through ports and wires. A store differs from a module in that it is labeled with additional attributes such as the amount of storage required, required access speed, or a minimum number of outstanding storage requests. The store extends the model by adding a specialized type of module with additional semantic information.

The model can be farther augmented with ports extensions. For example, an event source and an event sink are used for discrete semantic messaging between modules and module extensions, such as stores. Event sinks are specialized ports in that they are communication access points between model components, but with additional semantics, namely the specific events.

The model can also be augmented with wires extensions. For example, an event wire is a logical connection between event sources and event sinks, and carries event messages used to inform modules and implement policy. While most wire extensions allow communication at run time, it is possible for some wire extensions to transfer data only at compile or initialization time.

The model components are arranged and interconnected to form a scale-independent model of the application. Each component specifies some functionality of the application.

Associated with the model components is a schema that dictates how the functional operations represented by the components are to be specified. For example, the schema might dictate that a module specify processing requirements, software programs needed to implement the behavior, other modules with which the module should communicate, and so forth. The schema might further dictate that a port and a wire specify a set of attributes describing format, semantics, protocol, and so on. The schema might further dictate that extensions of modules, port, and wires specify further attributes.

From the model components, the developers can create logical, scale-independent models of the applications that may be implemented by the distributed computer systems. An application is scale-independent in that it is invariant with respect to the number of computers and software programs that my eventually be used to implement it. The application may subsequently be converted to a physical blueprint that specifies the number and type of hardware/software resources and the physical layout of the distributed computer system.

DETAILED DESCRIPTION

A modeling system permits developers of distributed computer applications (e.g., Internet Services, Websites, and the like) to architect their hardware and software in an abstract manner. The modeling system defines a set of components used to describe the functionality of an application in a logical, scale-independent manner. An "application" within this context refers to an entire service hosted on the distributed computers. For instance, an Internet data center may host a Website for an online retailer, where the application entails the entire software and hardware configuration that implements the online retailer's Internet presence. The application might include, for example, a front end to handle client requests, an order processing system, a billing system, an inventory system, and a database system.

The model components are arranged and interconnected to form a scale-independent model of the application. Each component specifies some functionality of the application. The model can then be used to construct a scalable physical blueprint in terms of which machines run which pieces of software to form the application. The model continues to be helpful for managing ongoing operations of the application, forming the skeleton upon which operational behavior and policy mechanisms are built.

In this manner, the modeling system changes the development effort from a node-centric approach to an application-centric approach. With conventional node-centric methodology, the focus was on the computers and how they were laid out. The application was then implemented on as many nodes as needed. With the new application-centric approach, the focus is initially on the application itself. The physical nodes used to implement the application are derived once the application is created.

The modeling system is described in the context of Internet Services and Websites, such as might be deployed in Internet Data Centers, because modeling Internet Services represents one suitable use of the system. However, the modeling system may be implemented to model other large size and scalable computer systems. Accordingly, the modeling system can be implemented in a wide variety ways, including both Internet-based implementations and non-Internet-based implementations.

Model Components and Schema

The modeling system defines several model components that form the building blocks of a logical, scale-independent application: a module, a port, and a wire. It also defines a set of model extensions including, but not limited to: a store, an event source, an event sink, and an event wire. In a design tool, the components are represented pictorially as graphical elements or symbols that may be arranged and interconnected to create scale-independent models of Website applications. The graphical elements have an associated schema that dictates how the functional operations being represented by the graphical elements are to be specified.

Figure 1:
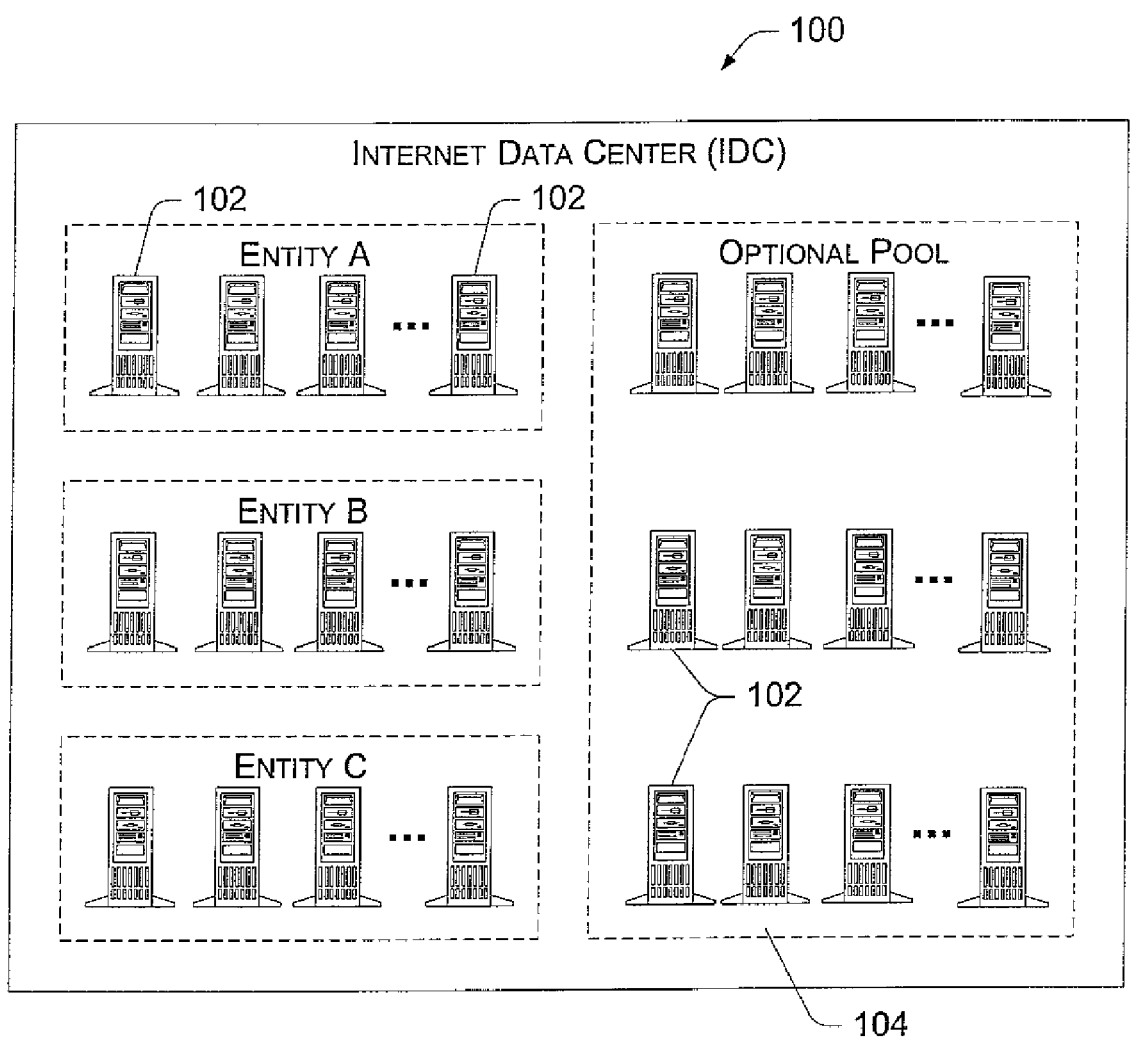
FIG. 1 illustrates a conventional Internet data center (IDC).
Figure 2:
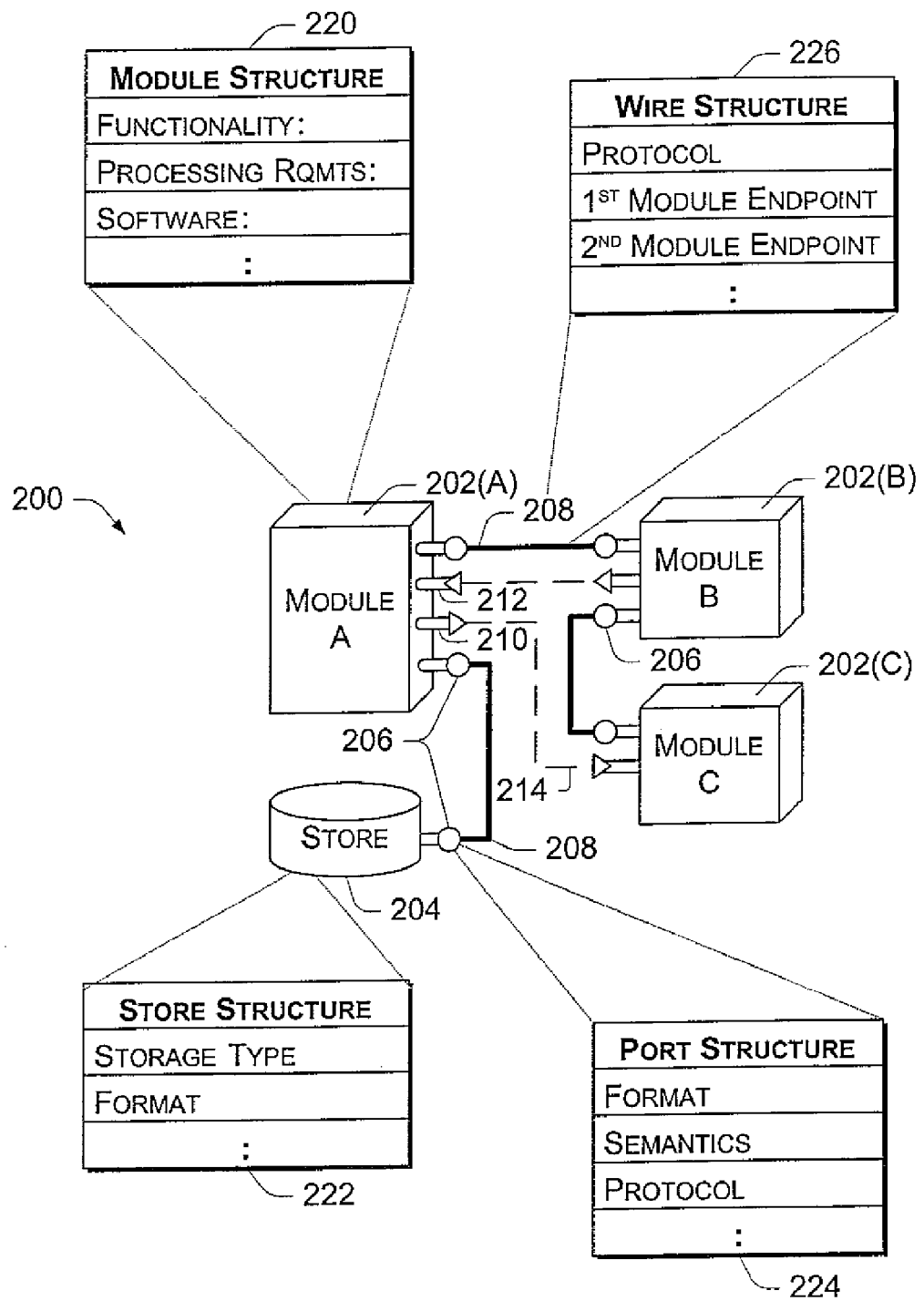
FIG. 2 illustrates a set of model components that form the building blocks for modeling an Internet Service, along with the associated schema.

FIG. 2 illustrates a set of model components 200 that form the building blocks of logical, scale-independent Internet Services. The components include a module, as represented by modules 202(A)-202(C), ports 206, wires 208, and extensions such as a store 204, event sources 210, event sinks 212, and event wires 214. The components 200 are arranged in a no particular manner other than to foster discussion of their individual traits.

A module 202 represents a basic unit of functionality for the Internet Service. It is a logical entity that represents some portion of the application as might be deployed at the IDC, but it does not necessarily have a physical manifestation. The module often corresponds to a software program that handles a logical set of tasks for the Service. For instance, one module might represent a front end for a Website, another module might represent a login database, and another module might represent an electronic mail program.

Each module 202 is a container of behavior. A simple module is indivisible and has associated a unique identifier. Modules can be nested into a hierarchy of modules to form more complex behaviors. In a module hierarchy, the leaf modules are simple modules, and the non-leaf modules are compound modules.

Each module 202 defines a unit of scaling. While one module logically represents a functional operation of the Service, the module may be deployed to any number of computers when actually implemented. In this way, the module is scale independent, allowing the number of underlying computers used to implement the module to change at over time. When converted to a physical implementation, "module instances" are created from the modules. The module instances are assigned a unique identifier and maintain ancestral data regarding which module created them. The module instances of simple modules are often called "engines", which are software programs that run on individual computers.

A port 206 is a service access point (SAP) for a module 202 or store 204. All service-related communications into and out of a module go through a port 206. Each port 206 has a "type", which is a set of attributes describing format, semantics, protocol, and so forth. At runtime, the port represents a set of physical ports associated with the instantiated engines of the modules. Note that a given module might have any number of ports representing different services or functionality provided by the module.

A wire 208 is the logical binding that defines an allowable communication route between two ports 206. Each wire 208 can be type-checked (i.e., with respect to protocols, roles) and defines protocol configuration constraints (e.g., HTTP requires TCP, TCP requires IP, etc.).

Extensions to the model are additional components that specialize the role, behavior, and possibly graphical representation of the base components. Exemplary extensions include, but are not limited to, store 204, event source 210, event sink 212, and event wire 214.

A store 204 is the most basic unit of storage. It represents a logical storage partition, which may be implemented by any number of physical disks or other storage media.

Event sources 210 and event sinks 212 are used for discrete semantic messaging between modules and module extensions, such as stores. An event wire 214 is a logical connection between sources and sinks, and carries event messages used to inform modules or module extensions and implement policy (e.g., scaling, fail-over, monitoring, application processes, etc.).

The event sources 210 and event sinks 212, together with the ports 206, collectively form interfaces for communications to and from the modules 202 and module extensions, such as stores 204. The event sources and sinks may be implemented as ports that are configured for message handling.

The model components 200 are depicted as graphical icons or symbols that may be selected and interconnected using a modeling system (described below in more detail). In the illustrated example, the modules 202 are depicted as blocks, the store 204 is depicted as a disk storage icon, and the ports 206 are depicted as spherical knobs projecting from the modules or module extensions, such as stores. Additionally, the wires 208 are depicted as bold lines, the event sources 210 are depicted as triangles pointing away from the module or module extension, the event sinks 212 are depicted as triangles pointing toward the module or module extension, and the event wire 214 is depicted as a dashed line.

The graphical icons have an associated schema that dictates how the functional operations being represented by the icons are to be specified. For instance, a module icon may have a predefined schema that specifies the hardware and software resources used to implement the functionality represented by the module. Thus, a module for a database function might have characteristics pertaining to the kind of database (e.g., relational), the data structure (e.g., tables, relationships), software (e.g., SQL), software version, and so forth.

FIG. 2 also illustrates the schema underlying the graphical elements as exemplary data structures associated with the model components. Module 202(A) has an associated structure 220 that contains various characteristics for the module, such as functionality, processing requirements, software, and so forth. Modules 202(B) and 202(C) have similar structures (not shown). Model extensions also have associated structures. The store 204 has a corresponding structure 222 that defines the requirements for storage. The store schema structure 222 might include, for example, the kind of storage (e.g., disk), the storage format, and so on.

Each port 206 has a schema structure, as represented by structure 224, which dictates the port's type. Each wire 208 is also associated with a schema structure, such as structure 226, which outlines the protocols implemented by the connection. Similar schema structures may also be provide for event sources, event sinks, and event wires.

Using the model components, a developer can logically describe and configure scale-independent Internet Service prior to physically laying them out in Internet data centers. The developer drafts a model using a user interface to select and interconnect the model components. Once constructed, the modeling software generates the Internet Service based on the depicted model and the underlying schema. The Service may subsequently be converted into a physical blueprint that details the computers and software needed to implement the Service for a specified number of clients.

The scale-invariant nature of the modeling system allows Internet Service developers to focus only on designing software for a specific functional task (e.g., front end, login database, email program, etc.). All external communications can then be expressed in terms of transmitting to and receiving from one or more associated ports. In this manner, the Service developers need not worry about how many machines will be used to run the module; or how other modules of the scale-independent Internet Service are being configured.

Exemplary Module and Application

Figure 3:
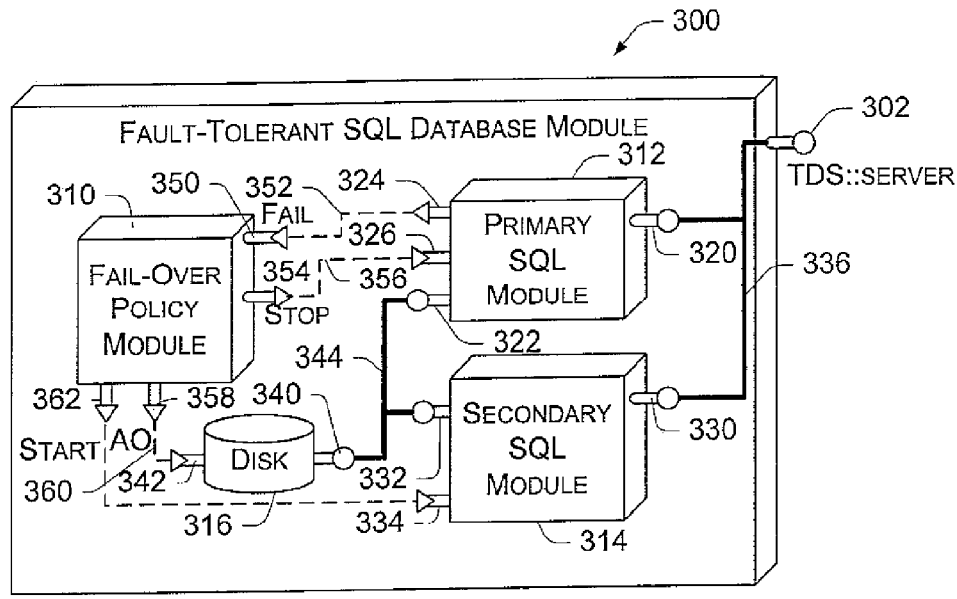
FIG. 3 illustrates a database application for an Internet Service that is modeled in terms of the components.

FIG. 3 shows a fault-tolerant SQL (structure query language) database module 300 to demonstrate how the model components may be organized and connected to represent a portion of an application. In this example, the database module 300 represents a SQL database that may be used independently or as a component in a larger application. The SQL database module 300 has a module interface composed of a single port 302 that implements the TDS (Tabular Data Stream) protocol.

The SQL database module 300 is a compound module made up of three simple modules: a fail-over policy module 310, a primary SQL module 312, and a secondary SQL module 314. The primary and secondary SQL modules represent dual programs that operate in parallel so that, in the event that the primary module 312 crashes, the secondary module 314 can assume the role without loss of service. The database module 300 also has a data store 316 that represents the memory storage for the SQL database module.

The primary SQL module 312 has a module interface that includes a first port 320 for communicating with the compound module port 302 and a second port 322 for communicating with the store 316. The primary SQL module 312 also has an event source 324 and an event sink 326 for handling event messages from the fail-over policy module 310. Similarly, the secondary SQL module 314 has a module interface with a first port 330 for communicating with the compound module port 302, a second port 332 for communicating with the store 316, and an event sink 334 for receiving events from the fail-over policy module 310. A wire 336 interconnects the external compound module port 302 with the ports 320 and 330 of the primary and secondary SQL modules, respectively.

The store 316 has a port 340 to communicate with the primary and secondary SQL modules 312 and an event sink 342 to receive event messages from the fail-over policy module 310. A wire 344 interconnects the store port 340 with the ports 322 and 332 of the primary and secondary SQL modules, respectively.

The fail-over policy module 310 has a module interface that includes three event sources and one event sink. An event sink 350 receives a "fail" event from the event source 324 of the primary SQL module 312 via an event wire 352 when the primary SQL module experiences some failure. In response to receiving a "fail" event, the fail-over policy module 310 concurrently issues a first event to stop the failed primary module 312, another event to assign the secondary module 314 as the new owner of the store 316, and a third event to start the secondary module 314. The "stop" event is issued via an event source 354 over an event wire 356 to the event sink 326 of the primary SQL module 312. The "stop" event directs the primary SQL module 312 to halt operation.

The fail-over policy module 310 issues an "assign owner" (AO) event from an event source 358, over the event wire 360 to the event sink 342 of the store 316. The assign owner event directs the storage mechanisms to switch to allowing access by the secondary SQL module 314, rather than the primary SQL module 312. The fail-over policy module 310 also issues a "start" event from event source 362 over event wire 364 to the event sink 334 of the secondary module 314. The start event directs the secondary SQL module to start operation in place of the primary SQL module.

The SQL database module 300 illustrates how the base model components and exemplary model extensions—modules, ports, wires, stores, event sources, event sinks, and event wires—may be arranged and interconnected to form a complex module. The developer specifies the characteristics associated with each component according to the prescribed schema. The complex module may in turn be added to other simple or complex modules to form other complex modules. Eventually, the largest complex module becomes the Internet Service, which may then be used to form a blueprint for deploying to the data center.

Figure 4:
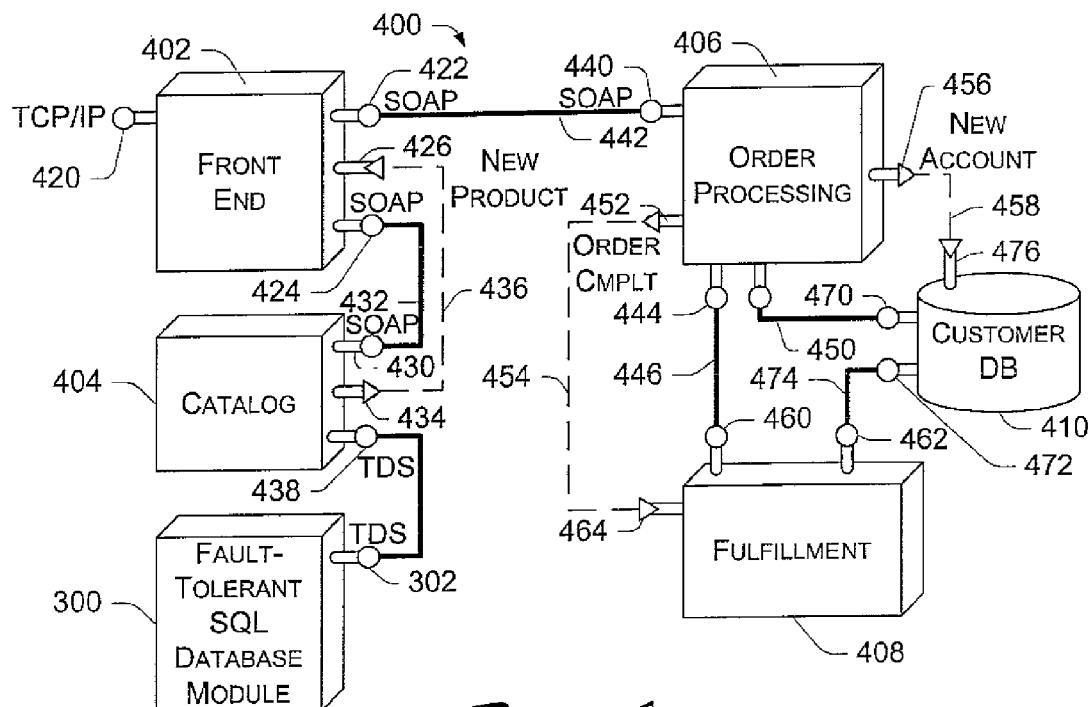
FIG. 4 illustrates an Internet-based email Internet Service.

FIG. 4 shows a simplified application 400 for an online retailer. The application 400 includes a front end module 402, a catalog module 404, an order processing module 406, and a fulfillment module 408. The application 400 also includes a customer database 410 and the fault-tolerant SQL database module 300. Notice that the SQL database module 300 is the same as that shown in FIG. 3 to illustrate how complex modules can be nested into even greater complex modules to form an application.

The front end module 402 handles requests from clients who wish to shop with the online retailer. The front end module 402 has a port 420 that accommodates communications with external clients using the TCP/IP protocol over the Internet. The front end module 402 also has an order port 422 to define a communication exchange with the order processing module 406 and a catalog port 424 for communication flow to the catalog module 404. The ports 422 and 424 may be configured according to any of a variety of types, which support any of a number of protocols including SOAP, TCP, or UDP. An event sink 426 is also provided to receive a "new product" message from the catalog module 404 when a new product has been added to the catalog.

The catalog module 404 provides catalog information that may be served by the front end to the requesting clients. The catalog module 404 has a front end port 430 connected via a wire 432 to the catalog port 424 of the front end module 402. The front end port 430 has a type that matches the catalog port 424. The catalog module 404 also has an event source 434 for communicating the "new product" messages over wire 436 to the event sink 426 of the front end module 402.

A SQL port 438 interfaces the catalog module 404 with the SQL database module 300. The SQL port 438 has a type that utilizes the TDS protocol for the communication exchange with the external port 302 of the SQL database 300.

The order processing module 406 has a front end port 440 to define a communication interface with the front end module 402 via a wire 442. The order processing module 406 also has a fulfillment port 444 to facilitate communication with the fulfillment module 408 over wire 446 and a database port 448 to facilitate communication with the customer database 410 via wire 450.

An event source 452 is provided at the order processing module 406 to pass "order complete" events to the fulfillment module 408 via wire 454. These events inform the fulfillment module 408 that an order is complete and ready to be filled. A second event source 456 passes "new account" events to the customer database 410 via wire 458 whenever a new customer orders a product.

The fulfillment module 408 has an order port 460 to provide access to the wire 446 to the order processing module 406 and a database port 462 to interface with the customer database 410. The fulfillment module 408 also has an event sink 464 to receive the "order complete" events from the order processing module 406.

The customer database 410 has an order port 470 to provide access to wire 450 and a fulfillment port 472 to facilitate communication with the fulfillment module 408 via wire 474. The customer database 410 further has an event sink 476 to receive the "new account" events from the order processing module 406.

The modeling approach illustrated in FIGS. 3 and 4 is tremendously beneficial because it allows developers and IDC operators to view the entire Internet Service in terms of functional pieces independent of deployment scale. The online retailer Internet Service 400, for example, requires a front end unit, a catalog unit, an order processing unit, and a fulfillment unit regardless of whether the retailer is handling 100 hits a day or 10 million hits per day.

The scale-independent nature frees the developer to focus on his/her little piece of the Service. For instance, a developer assigned the task of building the front end module 402 need only be concerned with writing software code to facilitate response/reply exchanges. Any communication to and from the module is defined in terms of order-related data being passed to the order processing module 406 via the order port 422 and product data being received from the catalog module 404 via the catalog port 424. The developer defines the data flow to and from the order port 422 and the catalog port 424 according to their respective associated protocol types.

The Internet Service 400 can then be used to construct a computer system that hosts the online retailer. Initially, the online retailer may not receive very much traffic, especially if launched away from the Christmas season. So, perhaps the front end module 402 deploys initially to only a few computers to handle the light traffic from the Internet. But, suppose that over time the site becomes more popular and the Christmas season is fast approaching. In this situation, the online retailer may authorize the IDC operator to add many more computers for the front end tasks. These computers are equipped with software and configured to accept HTTP requests for product information and to serve web pages containing the product information. The computers are added (or removed) as needed, without altering the basic description of the Internet Service 400.

Computer-Based Modeling System and Method

Figure 5:
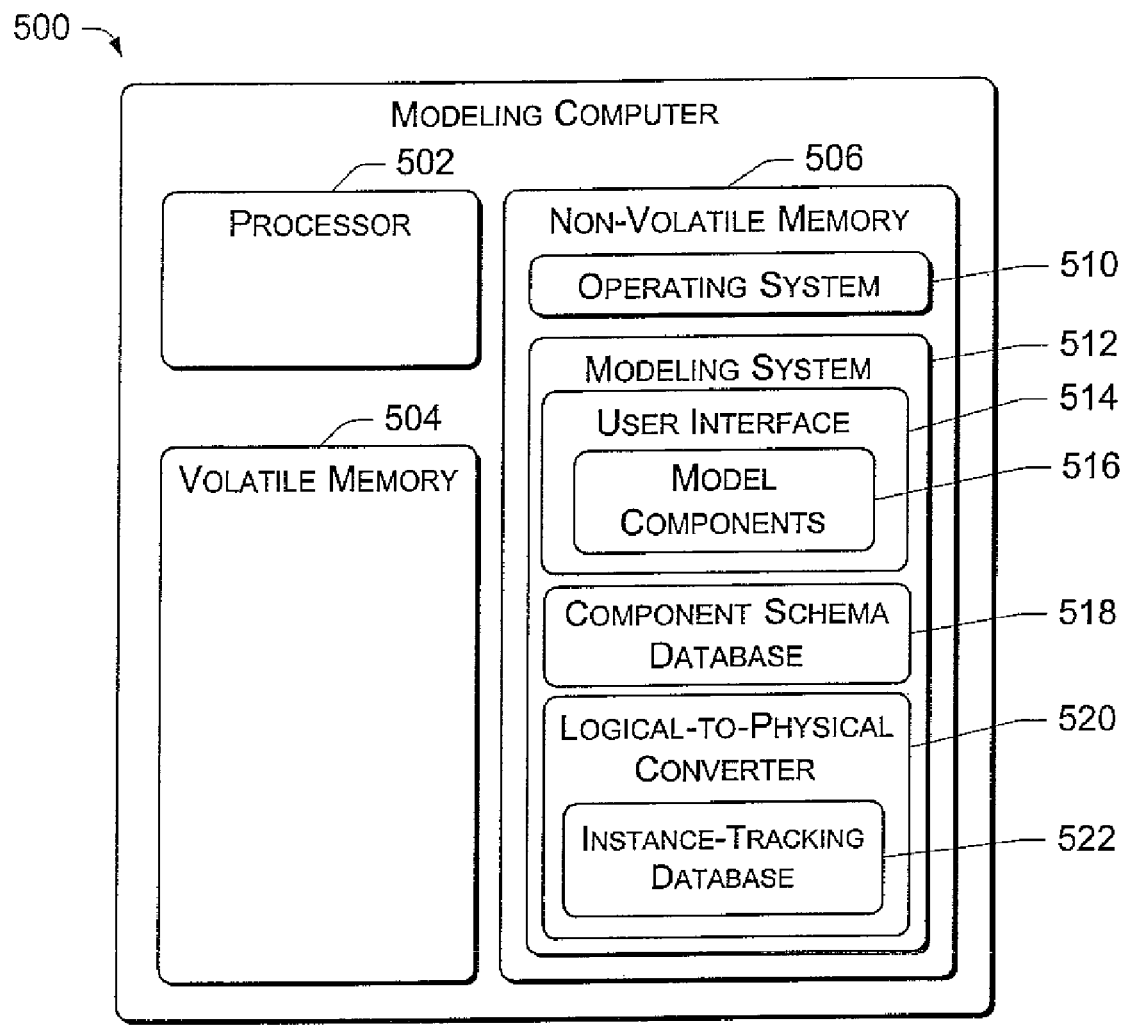
FIG. 5 is a block diagram of a computer that may be used to implement the modeling software for modeling the Internet Service.

FIG. 5 shows an exemplary computer system 500 that implements modeling software used to design Internet Services. The modeling computer may be implemented as one of the nodes in a Internet Service, or as a separate computer not included as one of the nodes. The modeling computer has a processor 502, volatile memory 504 (e.g., RAM), and non-volatile memory 506 (e.g., ROM, Flash, hard disk, optical, RAID memory, etc.). The modeling computer 500 runs an operating system 510 and modeling system 512.

For purposes of illustration, operating system 510 and modeling system 512 are illustrated as discrete blocks stored in the non-volatile memory 506, although it is recognized that such programs and components reside at various times in different storage components of the computer 500 and are executed by the processor 502. Generally, these software components are stored in non-volatile memory 506 and from there, are loaded at least partially into the volatile main memory 504 for execution on the processor 502.

The modeling system 512 includes a user interface 514 (e.g., a graphical UI) that presents the pictorial icons of the model components 516 (e.g., modules, ports, sources, sinks, etc.), a component schema database 518, a logical-to-physical converter 520, and an instance-tracking database 522. The modeling system 512 allows a developer to design an Internet Service by defining modules, ports, wires, and event message schemes. The user interface 514 presents symbols of the components 516, such as the symbols shown in FIGS. 2-4, and permits the developer to arrange and interconnect them. The UI 514 may even support conventional UI techniques as drag-and-drop operations.

The symbols depicted on the screen represent an underlying schema 518 that is used to define the model. For instance, a block-like module symbol is associated with the characteristics of the functionality that the module is to represent in the Internet Service. Thus, the developer may define a database module that has characteristics pertaining to the kind of database (e.g., relational), the data structure (e.g., tables, relationships), software (e.g., SQL), software version, and so forth. Accordingly, by drafting the model on the UI, the developer is architecting the entire schema that will be used to design the scale-independent Internet Service.

Once the Internet Service is created, the logical-to-physical converter 520 converts the Service to a physical blueprint that details the number of computers, software components, physical ports, and so forth. The converter takes various parameters—such as how many site visitors are expected, memory requirements, bandwidth requirements, processing capabilities, and the like—and scales the Internet Service according to the schema 518 created by the developer. The converter 520 specifies the number of computers needed to implement each module, the number of disks to accommodate the stores, and the types of communications protocols among the modules and stores. The identity of every component instance is recorded in an instance-tracking database 522. Instances in the instance-tracking database 522 include those for modules, port, wires, and instances of model extensions such as stores, event ports, and event wires.

In one embodiment, the developer writes management policy, which issues commands on the schema 518 to create new instances of modules, port, and wires to deploy the Internet Service. Developers may choose to write management policy instead of using fully automatic logical-to-physical converter 520 when they want finer control over the growth and management of the Internet Service. The management code issues commands using the namespace defined by the schema 518, but the commands operate on individual module, port, and wire instances. The commands are still dispatched through the converter 520, which allocates nodes to the management policy. Whether operating automatically or driven by management policy code, the convert 520 records in the instance-tracking database 522 the individual instances of modules, port, and wires.

In this manner, the modeling system changes the development effort from a node-centric approach for architecting Internet Services to an application-centric approach. Within conventional node-centric methodology, the focus was on the computers and how they were laid out. The Internet Services was then loaded onto the nodes in an ad hoc manner. With the new application-centric approach, the focus is initially on the Internet Service itself. The physical nodes used to implement the Internet Service are derived in terms of the Service schema once it is specified. The instance-tracking database 522 gives both developers and operators information about how many instances of each module are running at any time and how the modules are connected using port instances and wires instances within the Service schema.

Figure 6:
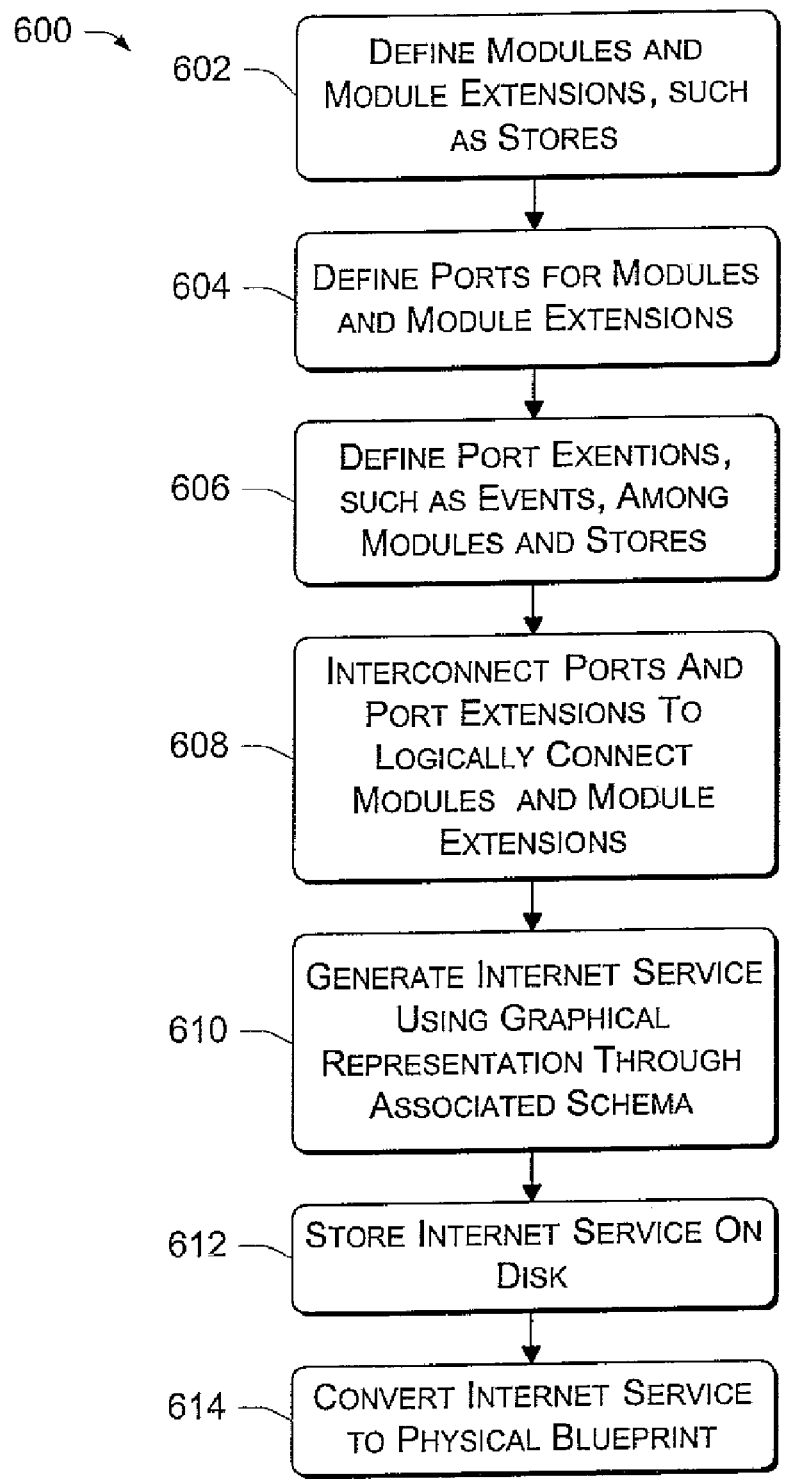
FIG. 6 is a flow diagram of a process for modeling an Internet Service.

FIG. 6 shows a method for modeling a scale-independent Internet Service. The method 600 may be implemented, for example, by the modeling system 512 executing on the modeling computer 500. In such an implementation, the method is implemented in software that, when executed on computer 500, performs the operations illustrated as blocks in FIG. 6.

At block 602, the modeling system 512 allows the developer to define the modules and extensions, such as stores, that form the functional elements of the Internet Service. The UI 514 enables the developer to create modules and extensions, such as stores, and to define their characteristics as prescribed by a predetermined schema. This entry process begins to construct the logical building blocks of the Service.

At block 604, the modeling system 512 enables the developer to define the ports for the modules and module extensions, such as stores. The developer selects the type of ports. The modeling system ensures compatibility of ports that are connected to one another. At block 606, the developer also defines other extensions, such as events that may be passed among modules and module extensions, such as stores. For example, the developer creates event sources and event sinks to accommodate the various events. At block 608, the developer uses the modeling system 512 to interconnect the ports with wires and the port extensions, such as event sources/sinks with wire extensions, such as event wires. By joining the various modules and module extensions, such as stores, the developer effectively forms a logical representation of the Internet Service.

At block 610, the modeling system 512 generates an Internet Service using the graphical representation constructed by the developer through its associated schema. The modeling system 512 generates the logical specifications associated with the graphical model, including the characteristics of the modules and module extensions, such as stores, as well as the types of the ports and port extensions such as event sources/sinks. The Internet Service provides a complete logical representation of the Service that will eventually be implemented at the Internet data center. The Internet Service description may be stored on disk or some other form of computer-readable medium (block 612).

At block 614, the modeling system 512 converts the Internet Service description to a physical blueprint that specifies the computers, the software run by each of the computers, and the interconnections among the computers. This physical blueprint may be used by the operator to install and manage the Internet Service.

CONCLUSION

Although the description above uses language that is specific to structural features and/or methodological acts, it is to be understood that the invention defined in the appended claims is not limited to the specific features or acts described.

Rather, the specific features and acts are disclosed as exemplary forms of implementing the invention.

The invention claimed is:

1. A computer-implemented method, wherein the method is implemented by a processor executing computer-executable instructions stored in a memory, the method comprising:
    generating a design of a distributed computer system at least in part by representing hardware and software resources of the distributed computer system as model components to be included in a design for the distributed computer system, wherein the model components are selected from a group comprising:
        a module that is representative of a behavior of an application that is implemented using the hardware and software resources and is to be implemented by the distributed computer system under design;
        a port that is representative of a service access point for the module; and
        a wire that is representative of an allowable communication connection between two or more ports; and
    forming, from the model components included in the design, a logical scale-independent model of the application to be implemented by the distributed computer system under design; and simulating the distributed computer system using the generated design.

2. The method of claim 1, wherein at least one of the model components represent one or more similar resources.

3. The method of claim 1, wherein at least one of the model components are depicted in a graphical user interface as a graphical icon.

4. The method of claim 1, wherein the model components have an associated schema that specifies the hardware and software resources represented by the model components.

5. The method of claim 1, wherein the group of the model components further comprises a store that is representative of persistent data storage.

6. The method of claim 1, wherein the group of the model components further comprises at least one of:
    a store that is representative of persistent data storage;
    an event source that is representative of a logical connection point for the module or the store from which event messages originate;
    an event sink that is representative of a logical connection point for the module or the store to receive the event messages; and
    an event wire that is representative of an interconnection between the event source and the event sink.

7. The method of claim 1, further comprising storing the scale-independent model on a computer-readable medium.

8. The method of claim 1, further comprising converting the scale-independent model into a blueprint of a server data center, the blueprint specifying the hardware and software resources used to physically implement the application.

9. A computer-readable medium storing computer-executable instructions that, when executed on a computer, perform the method of claim 1.

10. A computer-readable medium comprising computer-executable instructions that, when executed on one or more processors, direct a computing device to:
    enable design of a distributed computer system at least in part by:
        defining individual model components as abstract functional operations that are physically implemented by one or more computers to be included in a design of the distributed computer system and one or more software programs executing on the computers, the model components having an associated schema dictating how the functional operations are specified, wherein the model components represent resources provided by the computers and the software programs, the resources being scalable from one to many, wherein the model components are selected from a group comprising: a module that is representative of a behavior of the application, a port that is representative of a communication access point for the module, and a wire that is representative of an interconnection between two or more ports;
        interconnecting the model components to logically connect the functional operations; and
        generating a scale-independent application from the interconnected model components and the associated schema; and
    converting the scale-independent application into a blueprint that specifies the computers and the software programs used to physically implement the application.

11. The computer-readable medium of claim 10, further comprising computer-executable instructions that, when executed, cause at least one of the model components to be depicted in a graphical user interface as a graphical icon.

12. The computer-readable medium of claim 10, further comprising computer-executable instructions that, when executed, enable entering, via a user interface, a description of elements for implementing the functional operations.

13. The computer-readable medium of claim 10, further comprising computer-executable instructions that, when executed, define an instance tracking database that provides information regarding how many instances of one or more modules specified in the blueprint are running at a specified time.

14. The computer-readable medium of claim 13, wherein the information further identifies how the one or more modules are connected using port instances and wire instances.

15. The computer-readable medium of claim 10, wherein the group of the model components further comprises:
    a store that is representative of persistent data storage;
    an event source that is representative of a logical connection point for the module or the store from which event messages originate;
    an event sink that is representative of a logical connection point for the module or the store to receive the event messages; and
    an event wire that is representative of an interconnection between the event source and the event sink.

16. A system comprising:
    a processor;
    a memory coupled to the processor;
    computer-executable instructions stored in the memory and executed by the processor for enabling design of a distributed computer system at least in part by representing hardware and software resources of the distributed computer system as model components to be included in a design for the distributed computer system, wherein the model components are selected from a group comprising:
        a module that is representative of a behavior of an application that is implemented using the hardware and software resources and is to be implemented by the distributed computer system under design;
        a port that is representative of a communication access point for the module; and
        a wire that is representative of an interconnection between two or more ports; and
    wherein the computer-executable instructions executed by the processor associate the model components included in the design with a schema dictating how the hardware and software resources are specified.

17. The system of claim 16, wherein the group of the model components further comprises:

a store that is representative of persistent data storage;

an event source that is representative of a logical connection point for the module or the store from which event messages originate;

an event sink that is representative of a logical connection point for the module or the store to receive the event messages; and an event wire that is representative of an interconnection between the event source and the event sink.

18. The system of claim 16, wherein the computer-executable instructions executed by the processor create a scale-independent application from the model components and the associated schema.

19. A system of claim 16, wherein the computer-executable instructions executed by the processor convert the scale-independent application into a blueprint that specifies the hardware and software resources used to physically implement the application on the distributed computer system.

* * * * *